March 28, 1939.　　　U. PAVESI　　　2,151,714
CHANGE-SPEED DEVICE
Filed May 21, 1935　　　4 Sheets-Sheet 2
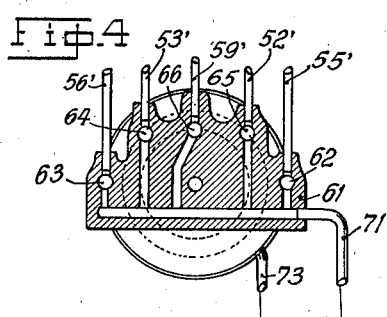
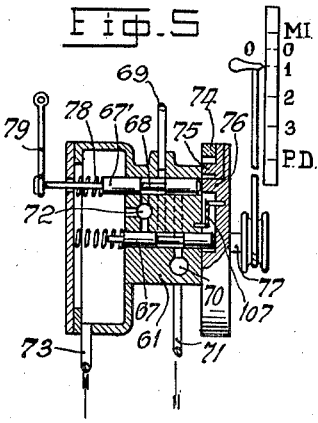
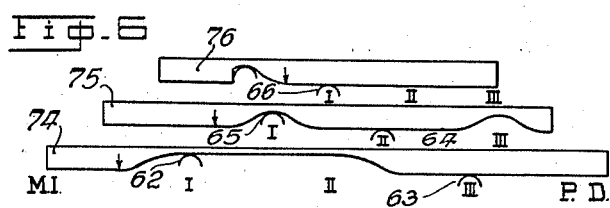
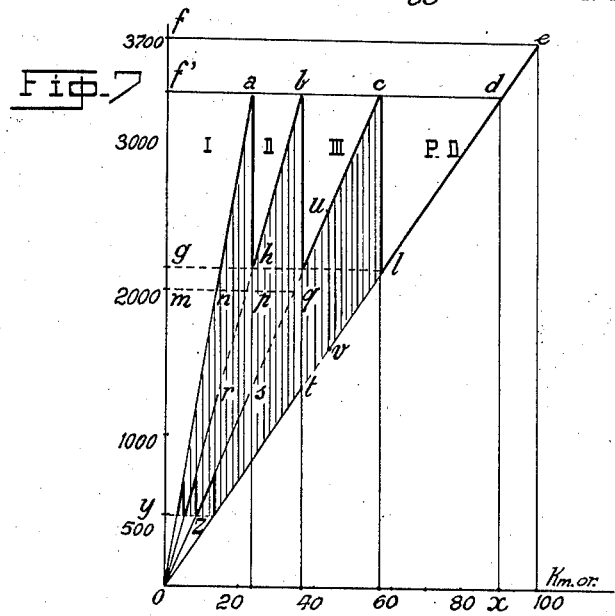
INVENTOR:
Ugo Pavesi
BY
Morrison, Kennedy & Campbell
ATTORNEYS.

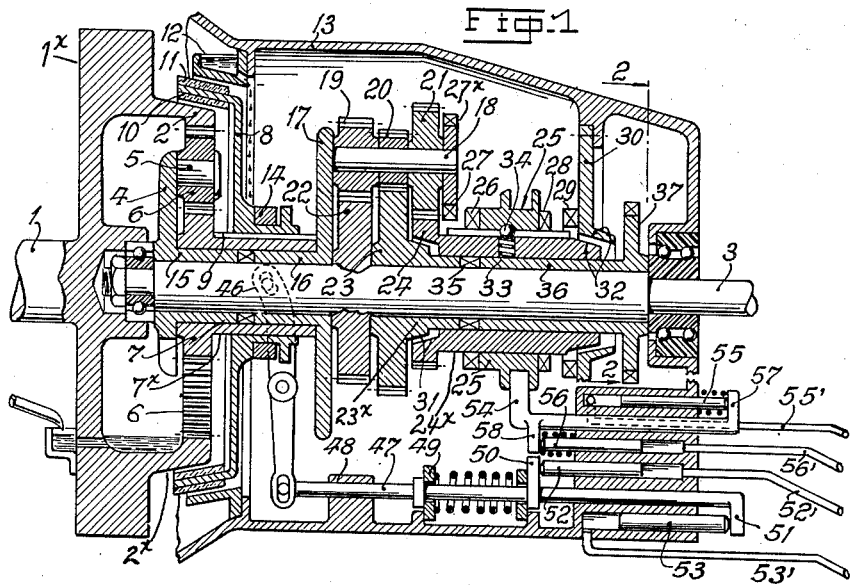

March 28, 1939.  U. PAVESI  2,151,714
CHANGE-SPEED DEVICE
Filed May 21, 1935   4 Sheets-Sheet 3

INVENTOR:
Ugo Pavesi
BY Morrison, Kennedy & Campbell
ATTORNEYS.

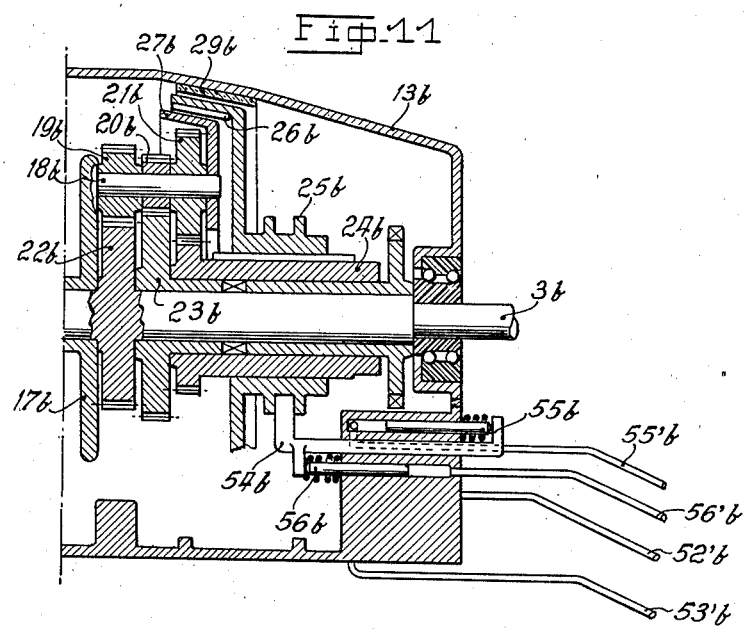
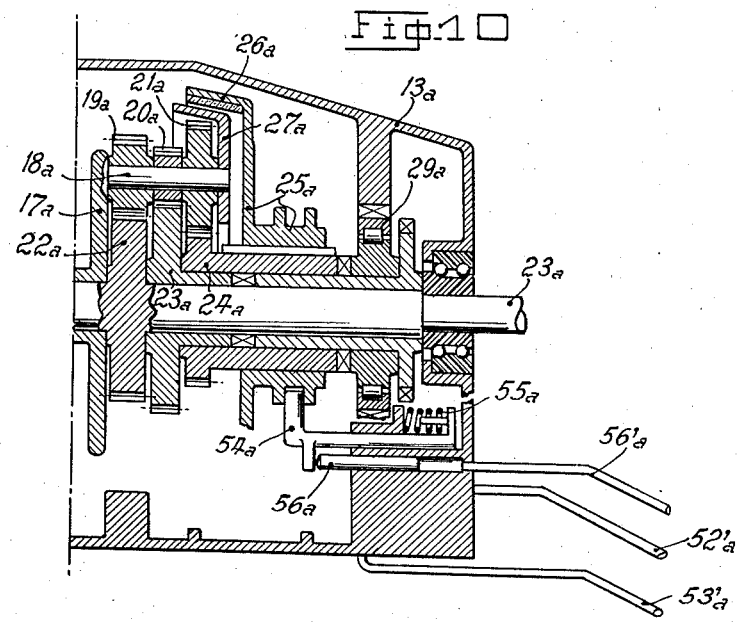

Patented Mar. 28, 1939

2,151,714

UNITED STATES PATENT OFFICE 2,151,714

CHANGE-SPEED DEVICE

Ugo Pavesi, Milan, Italy; Maria Ramognino, (late Pavesi) administratrix of said Ugo Pavesi, deceased Application May 21, 1935, Serial No. 22,542 In Italy May 23, 1934

9 Claims. (Cl. 74—262)

This invention relates to change-speed devices and is illustrated as a variable speed transmission of the multi-ratio epicyclic type, that is to say, comprising an epicyclic set adapted to give a direct drive or a reduction, as well as a further epicyclic set arranged in series with the first one, and adapted to give, for instance, a direct drive or a reduction or a reverse drive.

Epicyclic type change-speed mechanisms of multi-ratio construction are already known wherein are comprised two epicyclic sets connected in series, each being controlled by a clutch and brake means to provide various forward or reverse speeds of the driven parts by various combinations of the ratios of one set with those of the other set.

The object of the present invention is to provide a multi-ratio and reversing change-speed device which, while capable of being directly controlled by the driver either by hand or by pedal, is particularly adapted for indirect and also automatic control.

According to this invention there is provided a change-speed mechanism of the type referred to, comprising two epicyclic sets connected in series or tandem, and especially characterized in that the transmission from the first to the second set is effected through a rotary member or planet gear carrier of the first set arranged in fixed or invariable connection with a rotary member or planet gear carrier of the second set; that is, a unitary rotary member is the final member of the first set and at the same time the initial member of the second set.

The invention comprises a change speed mechanism of the type stated wherein one of the tandem epicyclic sets is controlled by friction coupling means for example of the conical, or disc, or band or similar kind, and the other set is controlled by positive clutch means, for example claw, tooth or dog clutches of friction type or self-locking type, or of any other type, synchronised or not synchronised, so that by the combination of each of the ratios of the first set with one or another of the ratios of the second set and various desired speeds or reverse of the driven shaft are obtained, the said combinations being effected by direct or indirect mechanical controls through hydraulic or electric, manually operated, automatic, semi-automatic or preselective servo-control apparatus.

Further objects, constructions and advantages of the disclosed embodiments of the invention will appear from the specific description following, and the novel features will be set forth in the claims.

The invention will now be described, by way of example with reference to the accompanying drawings, in which various constructional forms thereof are shown.

In the drawing:

Figure 1 shows a longitudinal section of an illustrative change speed device, embodying the invention.

Figure 2 is a cross sectional view, one half being a section along the line 2—2 in Figure 1.

Figure 3 is a detail view showing one form of device for the automatic control.

Figures 4 and 5 are horizontal cross-section and longitudinal section views respectively of a multiple valve regulator or distributor for the hydraulic control.

Figure 6 shows a cylindrical development of the cams operating the said multiple valve.

Figure 7 is a diagram of the speeds in a four ratio change-speed case.

Figure 9:
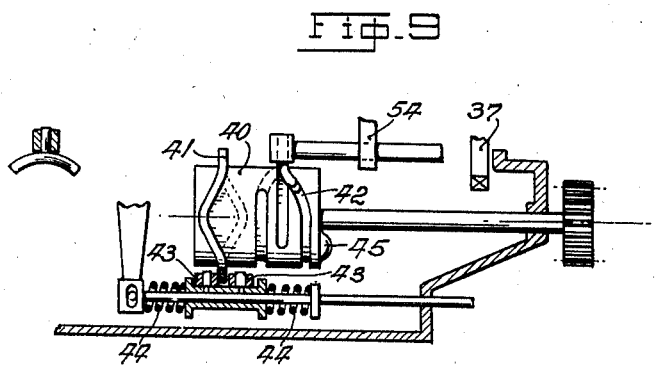

Figure 9 diagrammatically shows an embodiment of a mechanical control for the change-speed gear.

Figure 10 is a partial longitudinal section of a modified construction of the change-speed device of Figs. 1 and 2.

Figure 11 is a partial longitudinal section of another modified construction.

In Figure 1, as shown, 1 is the driving member or shaft with flywheel, the flywheel 1× being fitted with an internal toothed rim or gear 2. On the driven shaft 3, are loosely mounted a first rotary member or sleeve 7× and a second rotary member 15. On sleeve 15 is formed a disc 4 carrying the studs or spindles 5 and thereon the planet wheels 6 (two, three or four in number). The planets 6 engage externally with the toothed rim 2 and internally with the sun gear 7 on sleeve 7× which can rotate freely on the hub or sleeve 15 of disc 4.

The central or sun gear 7, in its turn, carries on its hub 7× the friction clutch member or disc 8 which, by means of feathers 9 is connected to and rotates with gear 7 but can slide along the longitudinal extension thereof.

The disc 8 carries two friction members 10 and 11 which in this figure are shown as being of conical type. Friction cone 10 can render disc 8 (and therewith gear 7) fast with the conical rim 2× of flywheel 1× (and thereby with shaft 1) with the consequence that the planet gear wheel 6 also is rendered immovable relatively to rim 2ˣ and gear 7, and that the disc 4 and its hub 15 are then directly driven from the shaft 1. In other words the first epicyclic train described is locked as a unit, and rotary sleeve 15 becomes effectively part of the driving shaft.

The friction cone 11 on the contrary can render the disc 8 (and therewith gear 7) fast with the counter-cone 12 immovably secured to the fixed casing 13, with the consequence that, when the shaft 1 revolves, the planet wheel 6 drags into rotation the disc 4 and its hub at a reduced speed relatively to the speed of the shaft 1, determined by the diameters of the gear train 2, 6 and 7.

The friction disc 8 may be actuated to apply the friction cone 10 or the friction 11 by means of a push-ring or collar 14 conveniently operated through parts 46, 47 etc. from outside as will be described below.

The hub 15 of disc 4 is coupled with the hub 16 of a further disc 17 which is likewise loosely mounted on the driven shaft 3. These parts constitute the second rotary member mentioned, and may be considered the main rotary member intermediate the flywheel and driven shaft, the first epicyclic gear set or train extending from the flywheel to this intermediate member and the second epicyclic train to be described extending from this member to the driven shaft. The disc 17, by means of studs or spindles 18 carries the planet gears 19, 20, 21 of the second epicyclic set.

The wheel planet or gear 19 is engaged with the sun wheel 22 fixed on shaft 3; wheel 20 is engaged with a wheel 23 loosely revolvable on shaft 3, and wheel 21 is engaged with a wheel 24 likewise loosely revolvable on the shaft 3. A third rotary member or sleeve 24ˣ carries the central gear 24 and a fourth rotary member 23ˣ carries the central gear 23.

A double acting clutch 25 is adapted to slide on the sleeve or hub extension 24ˣ of wheel 24. When the clutch 25 is slid to its left, the teeth 26 are brought into mesh with teeth 27 on disk 27ˣ fast on studs 18, and the wheel 24 is rendered fast with spindle 18 and with disc 17 so that a direct drive is obtained between disc 17 and driven shaft 3. When the clutch 25 is moved to the right, its teeth 28 are brought into engagement with fixed teeth 29 and the wheel 24 is rendered fast with the disc 30 carrying teeth 29 and immovably secured to the casing 13, a speed reduction being thus obtained between the speed of the disc 17 and the speed of the driven shaft 3, by adopting for the planet wheel 21 a larger diameter than for the planet 19.

In order to facilitate the meshing of the teeth 26 with 27 and 28 with 29 a double synchronising arrangement has been provided comprising for example two conical or friction couplings such as coupling 31 between sleeve 24ˣ or wheel 24 and sleeve 23ˣ or wheel 23, and coupling 32 between sleeve 24ˣ and disc 30. When the clutch 25 is moved to the left, the sleeve 24ˣ is pushed to the left by means of the yielding device or springs 33 and balls 34, thus first closing the conical coupling 31 and then by the yield of said device silently closing the clutch 26, 27, and in a similar way, when the clutch 25 is moved to the right first the conical coupling 32 is closed and then the closure of clutch 28, 29 is effected.

The gear wheel 23, in its turn, by means of its hub extension 23ˣ provided with coupling teeth at 35, turns with the sleeve or hub 36 of a toothed disc 37. By locking this disc 37 for instance by means of a pawl 38 (Figure 2) or a brake, a reversed revolution of the driven shaft 3 relatively to the disc 17 can be obtained, a smaller diameter for the planet wheel 20 being adopted than for the wheel 19 for this purpose.

Since the change from the forward direction to the reverse revolution must always take place when the driven shaft 3 is at rest and the disc 17 is loose, no synchronising arrangement is required for the coupling 38, 37.

By suitably designing the ratios of the different gear-wheels one may obtain:

(1) a direct drive by closing friction coupling 10—2 and the clutch 26, 27;

(2) third speed by closing friction coupling 11—12 and clutch 26, 27;

(3) second speed by closing friction coupling 10—2 and clutch 28, 29;

(4) first speed by closing friction coupling 11—12 and clutch 28, 29;

(5) reverse drive speed by closing friction coupling 10—2 and clutch 38, 37;

(6) reduced reverse drive speed by closing friction coupling 11—12 and clutch 38, 37.

Of course, in the control of the closing of the friction clutches or couplings and claw or tooth clutches, care must be taken that the closing of the clutches shall always take place when the friction cones are in an open position, by suitably arranging the sequence of the couplings.

In the modified construction according to Fig. 10 for the control of the direct drive of the second epicyclic set 17a—24a a conical friction coupling 26a—27a is provided controlled by a lever 54a, whereas for the locking of the hub 24a to the casing, in order to obtain a reduction, a freewheel 29a is provided mounted on the right end of the hub itself, said free-wheel running freely in the revolving direction of the engine and locking in the opposite direction.

When the friction clutch 26a—27a is locked, the hub 24a revolves in the same direction as the engine, and the free wheel is loose; on the contrary, as soon as the friction clutch is unlocked, the reaction of the driven shaft tends to cause the hub 24a to revolve in opposite direction to the engine, the free wheel is locked and stops 24a, thus giving the desired speed-reduction.

In the modified construction according to Fig. 11, on the contrary the hub 24b, in order to reduce the speed is stopped by locking the hub itself (by means of a second friction clutch 26b) against a member 29b which is fast with the casing.

In the change speed gear described, the operation of the friction clutches and claw clutches may be brought about in different manners either directly by hand or by pedal or by means of servo-controls, mechanical, hydraulic or electric, responsive to the manual control or to an automatic selector.

In the first class, the problem may be solved, for instance, with a control by means of a pedal for the friction clutches and by means of a hand lever for the other clutches, either directly or through the medium of a so-called preselecting arrangement.

Figure 9 diagrammatically shows an embodiment of a mechanical control for the change-speed gear described.

A multiple cam 40 is fitted with a projection 41 and a groove 42 of suitable profile. The first cam 41 by means of two rollers 43 and with the assistance of springs 44, which are loaded, operates the friction disc 8; the second cam 42 operates the double clutch 25, and the projection 45 operates the stop 38 for the reverse drive.

As it is shown, the cam 40 operates in two revolutions the whole cycle of combinations of the couplings, from the direct drive down to the reverse drive. When the cam is set in the intermediate position between any two speeds, neutral conditions (open friction cones) are always obtained.

The cam 40 may be operated either by hand or by means of a servo-control (mechanical or electrical).

By way of example an indirect servo-control device for the change-speed gear will now be described.

The friction disc 8 (Figure 1) is fitted with the thrust collar 14 operated in two directions by a fork 46 connected in turn to a rod 47 which can slide in guides 48 secured to the casing 13. A spring 49 acting in both directions tends to maintain the rod 47 and therewith the friction disc 8 in its intermediate neutral position.

On two extensions 50, 51 fast with the rod 47, acting in opposite directions are two small plungers 52 and 53 which when actuated at the suitable moment by an adequate pressure, cause the closure of one or other of the friction couplings.

In a similar way the double clutch 25 is operated by a fork 54, on the extension 57 and 58 of which act two plungers 55, 56 which can effect the closure of the claw clutches 26, 27 or 28, 29. A further plunger 59 (Figure 2) is provided for the control of the pawl 38 to effect locking of disc 37; the pawl 38 is normally held in the disengaged position by a spring 60.

The same control arrangement may be used also for the case of Fig. 11, whereas for the case of Fig. 10 the piston 55 may be omitted, a spring 55a being sufficient to unlock the friction clutch 26a—27a at the moment the pressure in the piston 56a ceases.

Each of the cylinders of the plungers 52, 53, 55, 56, 59 are connected by ducts 52', 53', 55', 56', 59' to an opening of a multiple distributing valve which is so arranged as to convey a pressure fluid (gas, air or liquid) to the various cylinders and plungers in the sequence and convenient combinations specified above to obtain the various speeds.

The multiple distributing valve may be of any preferred type; in Figures 4 and 5 a circular control type valve is shown.

In the valve body 61 are cylindrical holes 62, 63, 64, 65, 66 in which the plunger valves 67 fitted with a reduced portion 68 may take up two positions (position 67 or position 67' in Figure 5) thus connecting the outlet duct 69 of each valve either (position 67) to the collector 70 into which the pressure fluid from the pipe 71 is delivered, or (position 67') to the outlet collector 72 connected to the fluid return pipe 73. The valves 67 and 67' as designed are readily movable, thrusts exerted upon them by the fluid being at all times equalised. Over the valve body 61 a triple circular cam 74, 75, 76 is provided, which can revolve about a spindle 77, thus controlling the various plungers which are pushed at the opposite end by the springs 78. The three cams 74, 75, 76 possess a suitable profile for realising the necessary combinations, precedences and successions in the operation of the change-speed gear.

The cam 74 controls the passages 62 and 63 which are connected to the two plungers 55 and 56, and thereby operates the double clutch 25. The cam 75 controls the two passages 64 and 65 connected to the plungers 52 and 53, and thereby operates the double friction disc 8.

The cam 76 controls the passage 66 connected to the plunger 59 and thereby operates the clutch 37, 38.

In Figure 6, the developments of the suitable profiles for each cam are shown, corresponding to the insertion position of the first speed the pressure fluid passes through the passages 62, 65 into the ducts 53 and 52.

By moving the cams by ¼ turn to the left, the change to the second speed is obtained (the pressure fluid passes from 62 and 64 into 55' and 53'): for each successive ¼ turn the third speed and the direct drive are obtained. On the contrary by shifting the cam to the right by ⅛ turn the neutral position is obtained, and by shifting by a further ⅛ the reverse drive position is obtained (the pressure fluid passes from 64 and 66 into 53' and 59').

Below the two plungers in passages 64 and 65 controlling the double friction disc 8, a control device 79 is arranged which can lower, if discharge position is wanted, the two plungers even when the cam 75 would hold them in the raised position (inlet position). With the said operation it is thus practicable to establish at any time the neutral condition. The lever 79 may be connected to a manual control (on the handwheel or on the instrument board) or to a pedal replacing the normal friction pedal. As the operation of the equalised plungers in passages 64, 65 requires but a minimum power, the lever 79 may also be connected to the accelerator pedal so that when this pedal is released for idling, the said lever 79 sinks and brings the two plungers in 64, 65 into the discharge position and thereby brings the double friction disc 8 into the neutral position.

In this manner, freewheel conditions are readily obtained as well as the automatic disconnection of the transmission when it is desired to stop the vehicle without stopping the engine, by simply releasing the accelerator pedal. On the contrary as soon as the said pedal is depressed, the lever 79 rises and lets the plunger in 64 or 65 come again into connection with the pressure fluid source, according to the position of the cam 75, that is to say it closes one or the other of the two friction couplings 10 or 11.

The revolving motion of the triple cam 74, 75, 76 may be brought about by a manual control (Figure 5) provided on the handwheel or on the instrument board as may be found convenient.

The operation of the change-speed gear through a pressure fluid requires a certain time which is a function of the passage areas and of the cylinder volume swept by each plunger, the said time being adjustable at will for each of the plungers. This permits one first of all to obtain the most convenient succession and precedence in the locking and unlocking of the clutches and friction couplings. Further it permits (by quickly shifting the position of the cam 74, 75, 76) the change from any one running speed to any other running speed, even skipping over one or two intermediate speeds, as a quick shifting of one of the distributor valves in either direction does not allow sufficient time for the pressure fluid actually to carry out the connections and this even during full running; if the shifting is done while the accelerator is in the idling position, namely with lever 79 in the lowered position, the friction couplings remain in the free condition whatever may be the position taken up by the cam 74, 75, 76.

The pressure fluid may be a liquid compressed by a small pump and delivered into a small accumulator provided with a spring, though this is not indispensable, or it may be air or combustion gases separately compressed, or supplied by the cylinders of the vehicle engine.

The revolving motion of the distributor cam 74, 75, 76 instead of being brought about by a manual control at will of the driver, may be brought about by an automatic or semiautomatic special device, in the manner hereinafter described.

In Figure 7 the usual speed diagram is shown for a 4 ratios change-speed gear.

As is well known, it is desirable that in I, II, III speeds the engine shall not exceed an $f'$ number of revolutions somewhat lower than the $f$ number of revolutions of the maximum speed $f$ which the engine may attain in the direct drive.

There exists another intermediate speed $g$ of the engine which corresponds in II, III P. D. (direct drive) to the maximum speed $f$ in I, II, III. With lower ratios I, II, III there exists also a minimum engine speed $y$ below which it is not desirable or even possible to keep the vehicle running.

The whole hatched area in the diagram corresponds to possible running conditions according to the conditions of the resisting moment and partly according to whether the driver desires to run at the maximum allowed speed or at a lower speed for each of the load conditions.

An automatic control arrangement for replacing the manual operation in a satisfactory way must automatically bring about the change of speed within the limit-conditions in which the change is indispensable, but it must automatically permit the driver's instinct or will to intervene when such an intervention may be desired by him.

The arrangement to be described answers the said purpose.

Two variable elements are utilized for bringing about the speed change operation:

(1) The speed of the engine which acts automatically for instance, by means of a centrifugal governor;

(2) The stroke of the member controlling the accelerator, the said stroke being instinctively determined by the driver according to necessity.

Let us consider the vehicle while running with the transmission inserted for speed III, and with the engine revolving at a speed $u$ greater than the speed $i$ of line $g$. If the accelerator is not fully open, it is practicable to increase the speed by increasing the opening of the accelerator so as to reach the line $f'$ at $c$: at this point, the control being a function of the revolving speed of the engine (centrifugal governor) must bring about the change of speed by passing to the direct drive.

Starting from the same speed $u$, it is possible to slow down the engine by reducing the opening of the carburettor throttle until the speed $i$ is reached or even, if desired, until the minimum speed of line $y$ is reached.

On the contrary if, always starting from the speed $u$ due to an increase in the advancement resistance, the vehicle slows down in spite of the accelerator, being wide open when the speed has fallen to $i$, the same control organ of the accelerator fully depressed must bring about the change to the second speed, because, the fact of the accelerator being fully depressed instinctively coincides with the driver's wish or necessity of running at the maximum possible speed in the said conditions, which would not have been possible if the third speed had been preserved.

Let us consider the vehicle still running with the third speed inserted and with the engine revolving at a speed $q$ (below the line $g$). If the accelerator is not fully open, it is possible to increase the speed by increasing the throttle opening of the accelerator; if the load conditions (gradient) permit it, it will be possible to exceed the speed $i$ by returning to the conditions examined above. If, on the contrary, the accelerator must be fully depressed and the speed cannot attain the value $i$ while the instinctive will of the driver is to run faster, the very fact of depressing the accelerator fully, must bring about, also under these conditions, the change from speed III, to speed II.

When the resistance to advancement is low (travelling on the level) and the circumstances make it advisable, it may be desirable to have the possibility of automatically obtaining the change to the upper speeds without need of attaining the maximum speed $f'$, but as soon as a sufficient engine speed $m$ has been attained.

Under the above said advancement conditions, the engine speed $m$ will be reached with a carburettor opening smaller than the opening necessary for reaching the speed $f'$, so that it will be sufficient conveniently to alter the movement of the centrifugal governor along with the movement of the accelerator control, in order automatically to actuate the change to the upper speeds at the most suitable moment according to the advancement conditions.

Besides, since the accelerator is controlled by the driver, if the driver slowly moves the accelerator, the engine will accelerate too, and on reaching the speed $m$ the centrifugal governor will bring about the change to the higher speed; on the contrary if the accelerator is sharply depressed, the engine acceleration cannot keep pace with it, so that the engine must reach a higher speed $m$ or even $f'$ (according to the position attained by the accelerator), in order to effect the change to the higher speed.

Recapitulating, the upward changes must always be brought about by the centrifugal governor (in function of the engine speed) the stroke of which must be altered and is dependent on the degree of opening of the carburettor.

The downward changes must be brought about by the accelerator control when the accelerator is depressed fully, provided the engine speed is below the line $g$.

The driver's will instinctively intervenes to alter and operate the control in the most convenient manner according to the existing advancement conditions and to the speed wanted.

The automatic control device diagrammatically shown by way of example in Figure 3, fulfils all the working conditions above specified.

On the extension of the axis 77 a disc 80 is mounted having four special teeth and solid with the cam 74, 75, 76 for rotation.

A spring 107 (spiral spring) Figure 5 tends to cause the disc 80 and the cam to revolve clockwise, which corresponds to operating the valves so as to bring about the change to higher speeds. A double pawl 81, by means of its tooth 82, holds the disc 80 in the desired position.

A rod 83 is adapted to slide under the action of an arm 84 connected to a centrifugal governor, so that the positions of said rod are determined by the engine speed. A cam 85 having a suitable profile is adapted to actuate the tail piece of pawl 81 thus disengaging the tooth 82 from the disc 80, which latter under the action of the spring will make a quarter turn in clockwise direction and thus cause the cam 74, 75, 76 to make a corresponding quarter turn and thereby effect the change from one speed to the higher speed. The secondary pawl 86 prevents the disc 80 from making more than a quarter turn at a time.

A rod 87 is arranged above the disc 80; when this rod is pushed forward, its projecting pin 88 pushes the projecting pin 89 of the disc 80 up to a position 89' (not shown) in which it is retained by the tooth 82 of the pawl 81 even when, on cessation of the pushing action, the rod 87 is restored to its former position by the spring 90.

The rod 87 is operated at 91 by the accelerator pedal at the end of the stroke and after the carburettor throttle has been fully opened; on its travel from position 88 to 89', the rod 87 causes the cam 74, 75, 76 to make a quarter turn in anti-clockwise direction, whereby this cam causes the change from one speed to the lower speed.

The rod 83 and cam 85 may also be caused to revolve about their axis, for instance by means of a sheave 92 over which passes a cable 93 connected to the accelerator control 94. The profile of the cam 85 and the said connection are so designed that, when the carburettor aperture is small, the contact between the cam 85 and the tail of the pawl 81 takes place when the engine reaches a desired speed $m$ (Figure 7) for instance 1800 or 2000 R. P. M. whereas according as the carburettor opening is increased, the control by the pawl 81 takes place at a progressively higher speed according to a pre-established law, until, when the carburettor is fully open, the operation of the pawl 81 will take place only at the speed $f'$ (Figure 7) for instance at 3200–3400 R. P. M.

The variation of drive of the pawl 81 may also be produced by modifying at will, f. i. by hand control, the charge of the spring counteracting the centrifugal regulator. To a lightly charged spring will correspond changes increasing with slow rotation of the engine (for instance 1800 to 2000 R. P. M.); by increasing the charge, increasing changes will be obtained only at higher speeds (f. i. 3200 to 3600 R. P. M.). Instead of by hand, the charge of the spring counteracting the regulator, may be produced by the accelerator control itself, thus obtaining the desired variation in the range of rising changes in dependance from the aperture of the carburettor by means different from those pointed out above (rotation rod 63 and cam 85).

The rod 83 has a conical bottom end 95 which, when the engine reaches or exceeds the speed $g$ (Figure 7) comes into contact with a locking bolt 96 and pushes this latter a few millimeters to the right so that it moves into the path of the shoulder 97 of rod 87. Even if the accelerator is now fully depressed, the change to the lower speed cannot be effected when the engine speed is greater than $g$.

The automatic control can and must take care only of the change from direct drive of speed I; it is necessary to maintain the manual control for the change to the neutral position or the reverse running position.

Figure 8:
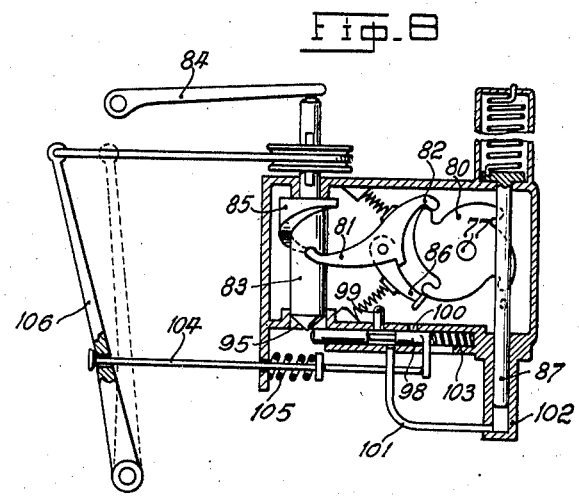
Figure 8 is a view like Fig. 3 showing a hydraulic servo-control device.

The operation of rod 87 at the end of the accelerator stroke, instead of being mechanically effected by parts connected to the pedal, may be effected by a small hydraulic or electric auxiliary servo-control. In Figure 8, a hydraulic servo-control device is diagrammatically shown. 98 is a cylindrical two-way valve; passage 99 is connected to the pressure fluid source; 100 is the pressure fluid outlet, and 101 a pipe conveying the pressure fluid into a cylinder 102 wherein it actuates a plunger 87.

The valve 98 is operated by the end cone 95 of rod 83 and is pushed by said cone to the right into discharge position when the engine speed is greater than $g$ (Figure 7) and under these conditions it prevents all movement of the plunger 87 and all possibility of changing the existing speed to a lower speed.

On the contrary when the engine speed is below $g$ the rod 83 does not intervene. The valve can, if necessary, be pushed by the spring 103 to the right, thus connecting 99 to 102 and causing the pressure fluid to push the plunger 87. The rod 104, however, due to the action of the spring 105 which is stronger than spring 103, contributes to maintain the valve 98 normally open.

On the contrary when the accelerator after reaching the end of its stroke is depressed still further, the lever 106 connected to the accelerator pedal moves the rod 104 and compresses the spring 105, while the spring 103 forces the valve to the right and causes the pressure fluid to push the plunger 87, thus bringing about the passage from the direct drive to a lower speed.

With the servo-control above described, even if the driver continues depressing the accelerator fully home, as soon as the engine speed exceeds the value $g$, the rod 83 brings about the discharge of the valve and the plunger 87 falls back.

If the speed rises again up to the value $f'$, a change to the upper speed may automatically be obtained, while when the speed again becomes lower than $g$ all parts are in the requisite conditions for bringing about a new movement of valve 98 to the left, a push on plunger 87, and a change to a lower speed.

If we now assume that the cylinder 102 be replaced by a solenoid and the valve 98 by a switch inserted in an electric circuit connected to the battery, the current of which can flow through the solenoid, one would obtain (98 being in its left hand position) the pushing action of the solenoid on the plunger 87 as soon as the circuit is closed, and the falling back of said plunger as soon as the circuit is opened (98 in its right hand position); all the rest of the phases and combinations remain unaltered corresponding to the description above.

Moreover, the main control of the deplacements in the change of the double friction disc 8 and of the double clutch 25, instead of being carried out by plungers actuated by a pressure fluid, may be carried out by solenoids (or other suitable electric appliances) actuated by electric current. In this case, the distributor described above and shown in Figures 4 and 5 may remain unaltered, with the exception that the valves 67' and 75 should be replaced by electric switches which in their lower position should interrupt the circuit, (neutral condition) and in their upper position should close the circuit thus bringing about the desired control of the change-speed gear. Of course, the pipes 69 should be replaced by insulated electric wires. The circuit will be closed in the usual way across the metallic frame of the vehicle.

Having now particularly described and ascertained the nature of my said invention and in what manner the same is to be performed, I declare that what I claim is:

1. A change-speed mechanism for transmitting power from a driving shaft 1 to a driven shaft 3 of the class having first and second gear sets arranged in tandem and independently changeable to afford various speed ratios, and with clutch or brake means shiftable to effect such speed ratio changes; and characterized in that both gear sets are of the epicyclic class, the first comprising a sun gear 7 and a planet gear 6, and the second comprising a sun gear 22 and a planet gear 19 and there being in train between the two gear sets a unitary rotary carrier 4, 15, 16, 17, and the said planet gears 6, 19 of both the first and second gear sets having their gear-studs or bearings directly upon the said intermediate rotary carrier member; said unitary rotary carrier comprising a sleeve part 15, 16 concentric with the shafts, a first flange or web 4 carrying the stud 5 of the planet gear 6 of the first set, and a second flange 17 carrying the stud 18 of the planet gear 19 of the second set.

2. A change-speed mechanism for transmitting power from a driving shaft 1 to a driven shaft 3 of the class having first and second gear sets arranged in tandem and independently changeable to afford various speed ratios, and with clutch or brake means shiftable to effect such speed ratio changes; and characterized in that both gear sets are of the epicyclic class, the first comprising a sun gear 7 and a planet gear 6, and the second comprising a sun gear 22 and a planet gear 19 and there being in train between the two gear sets a unitary rotary carrier 4, 15, 16, 17, and the said planet gears 6, 19 of both the first and second gear sets having their gear-studs or bearings directly upon the said intermediate rotary carrier member; said unitary rotary carrier comprising a sleeve part 15, 16 concentric with the shafts, a first flange or web 4 carrying the stud 5 of the planet gear 6 of the first set, and a second flange 17 carrying the stud 18 of the planet gear 19 of the second set, and said unitary carrier being constructed in a plurality of parts attached to each other in assembly to form a rigid rotary member.

3. A change-speed mechanism for transmitting power from a driving shaft 1 to a driven shaft 3 of the class having first and second gear sets arranged in tandem and independently changeable to afford various speed ratios, and with clutch or brake means shiftable to effect such speed ratio changes; and characterized in that both gear sets are of the epicyclic class, the first comprising a sun gear 7 and a planet gear 6, and the second comprising a sun gear 22 and a planet gear 19 and there being in train between the two gear sets a unitary rotary carrier 4, 15, 16, 17, and the said planet gears 6, 19 of both the first and second gear sets having their gear-studs or bearings directly upon the said intermediate rotary carrier member; and said second gear set having a direct drive clutch which is frictional and has a lever to control it, and having also a speed reduction braking means which is operated by a free-wheeling device that runs free in the direction of driving shaft rotation and locks in the opposite direction.

4. A change-speed mechanism for transmitting power from a driving to a driven shaft of the class having first and second gear sets arranged in tandem and independently changeable to afford various speed ratios, and with clutch or brake means shiftable to effect such speed ratio changes; and characterized in that the second gear set is of the epicyclic class, comprising a planet gear 19 and there being in train between the two gear sets an intermediate rotary carrier 15, 16, 17, and the planet gear of the second gear set being carried directly upon the said rotary carrier, with a sun gear 22 on the driven shaft engaged by said planet gear; and characterized further in that the second gear set comprises another planet gear 21 carried on said carrier, larger than the first-mentioned planet gear, a rotary member 24× having a sun gear 24 meshing said larger planet gear, a further planet gear 20 carried on said carrier smaller than the first-mentioned planet gear, a rotary member 35, 36 having a sun gear 23 meshing said smaller planet gear; and the means to effect speed ratio changes in the second gear set comprising a clutch 26, 27 for coupling together said two rotary members for direct drive, and a clutch 28, 29 for holding at rest the first-mentioned rotary member for reduced speed drive, and a clutch 37, 38 for holding at rest the second-mentioned rotary member for reverse drive; and said direct drive clutch of the second gear set being frictional and having a lever to control it, whereas said speed reduction braking means is operated by a free-wheeling device that runs free in the direction of driving shaft rotation and locks in the opposite direction.

5. A change-speed mechanism for transmitting power from a driving to a driven shaft of the class having first and second gear sets arranged in tandem and independently changeable to afford various speed ratios, and with clutch or brake members shiftable to effect control of such speed ratio changes; and characterized in that in train between the two gear sets is an intermediate rotary carrier adapted to transmit power from the first to the second gear set at different speeds, and that both gear sets are of the epicyclic class and each comprises planet gears carried directly upon said carrier, whereby power is transmitted in series through one and the other of said two gear sets by way of said intermediate carrier, and that for operation of said shiftable control members is combined therewith a servo-control means which is actuable exteriorly to and independently of said gear sets.

6. A change-speed mechanism for transmitting power from a driving shaft 1 to a driven shaft 3 of the class having first and second gear sets arranged in tandem and independently changeable to afford various speed ratios, and with clutch or brake members shiftable to effect control of such speed ratio changes; and characterized in that both gear sets are of the epicyclic class, and that the first gear set comprises a sun gear 7 and a planet gear 6, and a third gear, and a second gear set comprises a sun gear 22 and a planet gear 19 and a third gear, and there being in train between the two gear sets a unitary rotary carrier 4, 15, 16, 17, adapted to transmit power from the first to the second gear set at different speeds, upon which carrier the intermediate gear members or planets 6, 19 of the two gear sets, have their bearings or studs directly mounted, whereby power is transmitted in series through one and the other of said two gear sets by way of said intermediate carrier; and characterized further in that shift connections 14, 46 are provided for the first gear set control member, and shift connections 54, 38 for the second gear set control member, with connections extending to exterior control points, together with a servo-control device independent of said gear sets and operating said shift connections.

7. A change-speed mechanism for transmitting power from a driving to a driven shaft of the class having first and second gear sets arranged in tandem and independently changeable to afford various speed ratios, and with clutch or brake members shiftable to effect control of such speed ratio changes; and characterized in that the second gear set is of the epicyclic class, comprising a first planet gear 19 and there being in train between the two gear sets an intermediate rotary carrier 15, 16, 17, and the bearing of the planet gear of the second gear set being carried directly upon the said rotary carrier, with a sun gear 22 on the driven shaft engaged by said planet gear; and characterized further in that the said second gear set comprises a second planet gear 21 carried on said carrier, larger than the first planet gear, a rotary member 24× having a sun gear 24 meshing said second planet gear, a third planet gear 20 carried on said carrier smaller than the first planet gear, a rotary member 35, 36 having a sun gear 23 meshing said third planet gear; and the means to effect speed ratio changes in the second gear set comprising a clutch 26, 27 for coupling together said two rotary members for direct drive, and a brake 28, 29 for holding at rest the first-mentioned rotary member for reduced speed drive, and a lock 37, 38 for holding at rest the second-mentioned rotary member for reverse drive; together with a servo-control device exterior and independent of said gear sets but arranged to operate said shiftable control members cooperatively.

8. A change-speed mechanism for transmitting power from a driving to a driven shaft of the class having first and second gear sets arranged in tandem and independently changeable to afford various speed ratios, and with clutch or brake members shiftable to effect control of such speed ratio changes; and characterized in that both gear sets are of the epicyclic class, each comprising planet gears, and there being in train between the two gear sets an intermediate rotary carrier, and the planet gears of both the first and second gear sets being carried directly upon the said intermediate rotary carrier; and said mechanism characterized further in having an accelerator, and in combination therewith a servo-control device 52, 53, 55, 56, 52′, 53′, 55′, 56′, a movable distributor 61 to 68, operating means 94, 91, 87 or 106, 104, 98 actuated by the servo-control device to cause the movements of the distributor thereby to shift said shiftable control members to effect a change to lower speed, said operating means having for operating it an operating member 94 or 106 controlled by said accelerator, speed controlled means 95, 96 or 95, 98 adapted to cause said device to come into action only when the motor speed has not exceeded a certain predetermined intermediate speed at any time when the accelerator has been shifted beyond its normal stroke end; and other means 85, 81 adapted to cause a movement of the distributor to shift said shiftable control members to effect a change to a higher speed, said other means having for controlling it another member 84 adapted to act when the motor has exceeded a predetermined speed.

9. A change-speed mechanism for transmitting power from a driving to a driven shaft of the class having first and second gear sets arranged in tandem and independently changeable to afford various speed ratios, and with clutch or brake means shiftable to effect such speed ratio changes; and characterized in that the second gear set is of the epicyclic class, comprising a planet gear 19 and there being in train between the two gear sets an intermediate rotary carrier 15, 16, 17, and the planet gear of the second gear set being carried directly upon the said rotary carrier, with a sun gear 22 on the driven shaft engaged by said planet gear, and characterized further in that the second gear set comprises another planet gear 21 carried on said carrier, larger than the first-mentioned planet gear, a rotary member 24× having a sun gear 24 meshing said larger planet gear, a further planet gear 20 carried on said carrier smaller than the first-mentioned planet gear, a rotary member 35, 36 having a sun gear 23 meshing said smaller planet gear; and the means to effect speed ratio changes in the second gear set comprising a clutch 26, 27 for coupling together said two rotary members for direct drive, and a clutch 28, 29 for holding at rest the first-mentioned rotary member for reduced speed drive, and a clutch 37, 38 for holding at rest the second-mentioned rotary member for reverse drive; and said mechanism characterized further in having an accelerator, and in combination therewith a servo-control device 52, 53, 55, 56, 52′, 53′, 55′, 56′, a movable distributor 61 to 68, operating means 94, 91, 87 or 106, 104, 98 actuated by the servo-control device to cause the movements of the distributor thereby to shift said shiftable control members to effect a change to lower speed, said operating means having for operating it an operating member 94 or 106 controlled by said accelerator, speed controlled means 95, 96 or 95, 98 adapted to cause said device to come into action only when the motor speed has not exceeded a certain predetermined intermediate speed at any time when the accelerator has been shifted beyond its normal stroke end; and other means 85, 81 adapted to cause a movement of the distributor to shift said shiftable control members to effect a change to a higher speed, said other means having for controlling it another member 84 adapted to act when the motor has exceeded a predetermined speed.

UGO PAVESI.